United States Patent [19]
Dicks

[11] Patent Number: 4,677,643
[45] Date of Patent: Jun. 30, 1987

[54] DEVICE FOR FEEDING ONE OR A PLURALITY OF ELECTRODES IN AN ELECTROTHERMAL FURNACE

[75] Inventor: Hermann Dicks, Berlin, Fed. Rep. of Germany

[73] Assignee: Licentia Patent-Verwaltungs-GmbH, Frankfurt am Main, Fed. Rep. of Germany

[21] Appl. No.: 753,356

[22] Filed: Jul. 9, 1985

Related U.S. Application Data

[63] Continuation-in-part of Ser. No. 710,179, Mar. 11, 1985, abandoned.

[30] Foreign Application Priority Data

Mar. 6, 1985 [DE] Fed. Rep. of Germany ....... 3508323
Mar. 9, 1984 [DE] Fed. Rep. of Germany .... 3409133
Mar. 6, 1985 [DE] Fed. Rep. of Germany .... 3508323

[51] Int. Cl.⁴ ...................... H05B 7/148; H05B 7/156
[52] U.S. Cl. ..................................... 373/105; 373/106
[58] Field of Search ................ 373/102, 109, 105, 106

[56] References Cited

U.S. PATENT DOCUMENTS 3,493,664  2/1970  Kopell .................................. 373/105
3,597,518  8/1971  Roberts ................................ 373/105
4,324,944  4/1982  Weihrich ............................. 373/105
4,349,912  9/1982  Bello .................................. 373/105

Primary Examiner—Roy N. Envall, Jr.
Attorney, Agent, or Firm—Spencer & Frank

[57] ABSTRACT

Operation control system for an electrothermal furnace having one or more electrode and a transformer unit for each electrode for supplying heating current to its associated electrode. The or each transformer unit includes a main transformer having a primary winding for receiving current from a mains and two secondary windings, and an additional transformer connected to derive an adjustable voltage from one of the second secondary windings. The adjustable voltage and the voltage across the other secondary winding of the main transformer are combined to supply the heating current to the electrode. The control system includes a switch and a current control unit connected in the transformer unit for giving the additional voltage a selected polarity relative to the voltage across the other secondary winding of the main transformer and for controlling the magnitude of the additional voltage. The system is initially controlled by a microprocessor, to bring the electrode current into a normal operating range, and is then controlled to maintain a desired electrode voltage and the desired operating current.

16 Claims, 10 Drawing Figures

MISSING PAGE TEMPORARY NOTICE

PATENT # 4677643 FOR ISSUE DATE 6-30-1987

HAS BEEN SCANNED, BUT WITH MISSING PAGE(S). UPON RECEIVING OF MISSING PAGE(S), THE ENTIRE DOCUMENT WILL RE RESCANNED. PLEASE CALL IMAGE DATA ADMINISTRATION STAFF OF 557-6154 IF YOU HAVE A QUESTION. ASK FOR DAVE GROOMS, ANITA YOUNG OR POLA JONES.

THIS NOTICE IS FOR THE MISSING PAGE CONTAINING:

DRAWING SHEET # 2

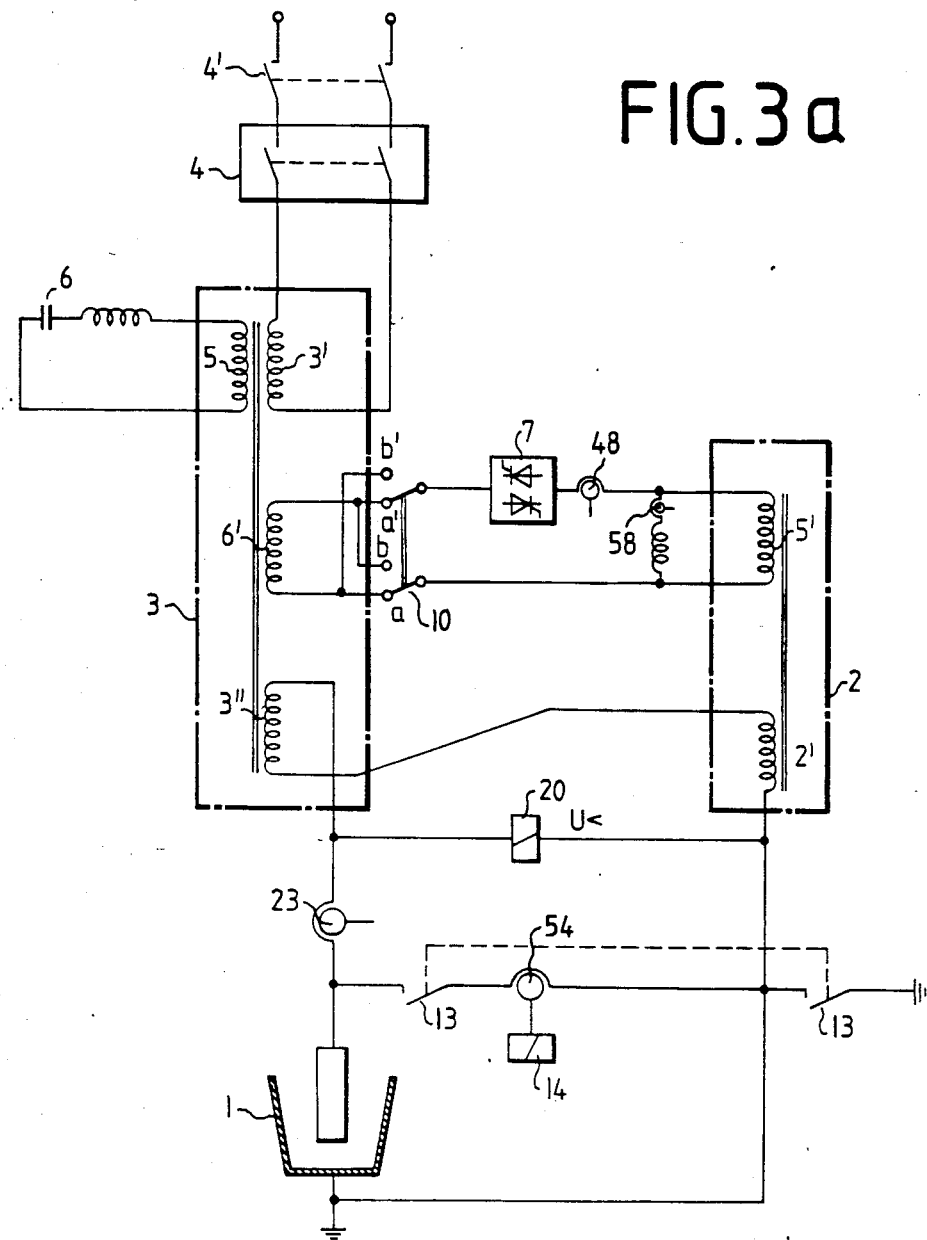

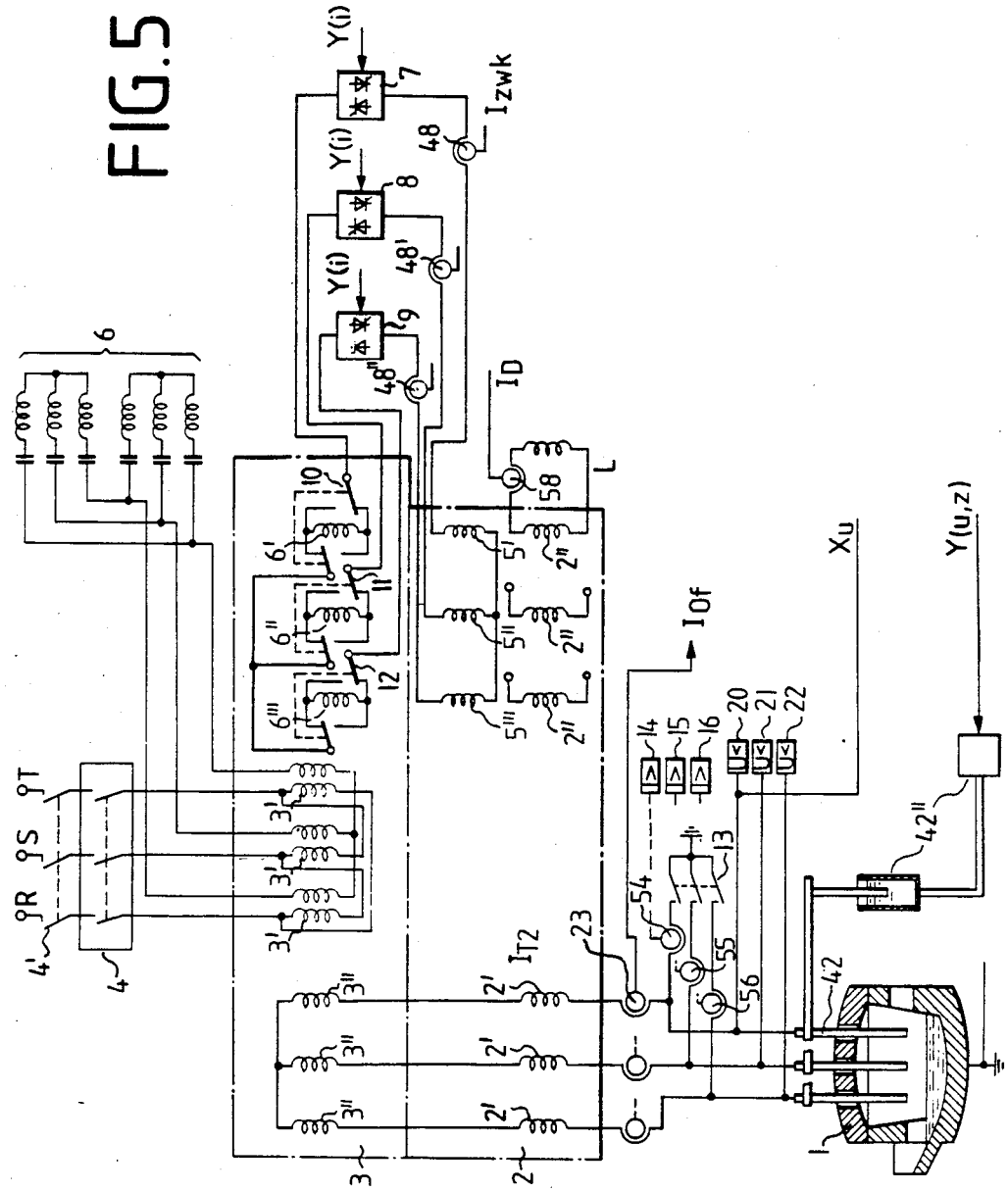

DEVICE FOR FEEDING ONE OR A PLURALITY OF ELECTRODES IN AN ELECTROTHERMAL FURNACE

CROSS REFERENCE TO RELATED APPLICATION

This application is a continuation-in-part of application Ser. No. 710,179, filed Mar. 11, 1985, now abandoned.

BACKGROUND OF THE INVENTION

The present invention relates to a device for feeding the electrode or electrodes of a signle or multiphase electrothermal furnace by means of a main transformer and an additional transformer, with the primary winding or windings of the main transformer being supplied with the mains voltage, the device further including a first secondary winding for transforming the primary voltage for the electrode and a second secondary winding for making available an adjustable additional voltage, with this additional voltage being summed with the primary voltage by means of the additional transformer.

In the past, the additional voltage has been set by means of a load stage switch which, in each stage, taps a certain amount of the voltages induced in the second secondary windings.

The present invention can be used in electric arc furnaces and also in reduction furnaces.

The amount of steel produced in electric arc furnaces is increasing steadily. However, to realize the most economical production, i.e. thermal efficiency, compared to oxygen converters for the production of mass-produced steels, furnace capacities and transformer terminal power have been increased steadily. A significant prerequisite for the operation of large furnaces, however, is a sufficiently strong mains, so as to substantially exclude reactive effects, e.g. voltage fluctuations, asymmetries, on the mains affecting the general energy supply and its consumers. If the mains short-circuit power is not great enough, cost-intensive dynamic compensation systems must be installed and connected in parallel with the electric arc furnace so as to compensate for fluctuations in reactive load.

These reactive load fluctuations occur particularly during the melting phase, caused, inter alia, by scrap sliding in and the single-phase, two-phase or three-phase short circuits and current interruptions associated therewith.

The most recent developments are directed toward the attainment of more favorable operating conditions with the aid of thyristor controlled direct current furnaces. Measurements have shown that these furnaces can significantly reduce mains voltage fluctuations.

However, a significant drawback of such furnaces is primarily that they usually have only one electrode so that the counterelectrode which must receive the return current to the thyristor system is disposed at the bottom of the furnace.

Complicated cooling of the bottom electrodes and time and cost consuming replacement of the bottom electrode are associated therewith.

In contrast to a three-electrode furnace, fluctuations in active power in the above-mentioned single electrode furnace are very distinct when the arc is quenched, between zero and maximum active power. This discontinuous use of power will have a negative effect primarily on productivity, as regards loss of melting times, and results in stresses on furnace and mains, including current surges.

High investment costs, brought about primarily by rectifier systems which must be designed for full furnace power, prevent, inter alia, the construction of larger units.

SUMMARY OF THE INVENTION

It is an object of the present invention to provide a device of the above-mentioned type with which reactive effects on the mains are reduced and better constant current maintenance and, for multi-electrode furnaces, individual control of the active power below the electrodes are realized.

The above and other objects are achieved, according to the invention, by the provision of an operation control system for an electrothermal furnace having at least one heating electrode, and transformer means for supplying heating current to the electrode, the transformer means for the electrode including a transformer unit having a primary winding connected to receive a mains voltage, a first secondary winding constituting a source of heating current for the electrode, and a second secondary winding, an additional transformer unit connected to derive an adjustable additional voltage from the second secondary winding, and means connected for deriving operating current for the electrode from the voltage across the first secondary winding and the adjustable additional voltage, the control system including a control assembly for the transformer means for the electrode, the control assembly comprises first measuring means operatively connected to the first secondary winding for deriving a first current signal representing the magnitude of the current through the first secondary winding: a third winding(s) (2") of the additional transformer in conjunction with choke coils (L) or capacitors (C) are provided as idling coil(s) to prevent current gap operation, with such coils being simultaneously operated as reactance compensation coil(s) if capacitors are used, with three-phases arrangement(s) being provided in delta, star or single-phase connection (see FIGS. 1 and 3) and selectively, by eliminating the winding(s) (2") of the additional transformer, connecting the idling choke coil(s) (L) directly in the intermediate circuit, in parallel with winding(s) (6') (FIG. 3a); signal supply means including a microprocessor for supplying a second current signal representing the desired magnitude of the current through the first secondary winding, based on a predetermined furnace operation schedule which represents the active power to be supplied by the electrode as a function of time; first arithmetic means connected to the first measuring means and the signal supply means for providing a difference signal representative of the difference between current magnitudes represented by the first and second current signals; current flow control means including a thyristor unit connected in series with the second secondary winding and the additional transformer for controlling the flow of current from the second secondary winding to the additional transformer, and thus the value of the additional voltage; regulating means connected between the first arithmetic means and the current flow control means for supplying to the thyristor unit firing pulses which are timed for causing the flow of current from the second secondary winding to be a function of the difference signal; and switch means operatively associated with the second secondary winding and switchable between a first state in which the operating current for the electrode is derived from the algebraic sum of the voltage across the first secondary winding and the adjustable additional voltage and a second state in which the operating current for the electrode is derived from the difference between the voltage across the first secondary winding and the adjustable additional voltage.

The advantages realized by the device according to the present invention are as follows:

1. Due to the low reactive effects on the mains as a result of keeping the current constant by means of thyristor control, a significant improvement is realized for mains connection conditions while maintaining the proven three-phase or alternating current furnace techniques for already existing systems and for newly installed systems.

It is particularly important that, if there are malfunctions in the electronic control or in the thyristor setting device, the system can continue to operate, if desired, in the conventional manner by operating with a tap changer.

A short-circuit device [connected in] parallel with the thyristor setting device would also be required in this case.

2. A more reliably constant current in conjunction with voltage regulation in the electric arc results, in electric arc furnaces, in reduced consumption of the graphite electrodes in that contact with the bath and with scrap is substantially avoided as are electrode breaks due to nonconductive scrap.

In contrast to conventional system, the electrode regulating device acts as impedance regulation $z = U/I$ and attempts to keep the impedance constant.

This means, for poorly conductive scrap, that the electrode regulating device attempts to increase the current, if it is too low, by lowering the electrode. The result is that the electrode breaks since it impinges on the poorly conductive material at too great a speed (great regulation deviation $\Delta z = (\Delta U/\Delta I)$, with $\Delta U = U$-maximum and I being very low) and horizontal forces may act on the electrode.

According to the invention, an attempt is made to bring the regulation deviation I to zero in the sense of a voltage increase with the aid of the variable voltage. If this is only conditionally successful, the resistor, due to the insufficient current flow, must be a highly ohmic resistor.

In this case, adjustment of the electrode is no longer initiated so that electrode breakage could thus be avoided.

In reduction furnaces, a more constant current reduces to a minimum electrode adjustments, or movements in the furnace burden which are required due to fluctuations in mains voltage and displacement of the furnace star point.

3. In conventional three-phase electric arc furnaces, operationally caused mains voltage fluctuations in the higher order energy supply result in a reduction in power which, depending on the regulating device, drops in proportion to or as a square of the voltage drop.

According to the present invention, it becomes possible to keep the power in the furnace constant even if the mains voltage drops.

4. If a plurality of electrodes are involved, the individual control of the active power below the electrodes results in good wear symmetry in the furnace, thus protecting the expensive refractory lining.

5. The fast response rate of the regulating device to operationally caused electrode short-circuits results in a reduction of the frequency of switching and of loads on the contacts of the furnace switch. Operationally caused turn-offs are substantially avoided by switching the output voltage of the additional transformer in phase opposition to the main transformer so that special switches for high switching frequencies (up to 80 switchings per day) are no longer required.

6. The fast response of the current regulating device makes it possible to operate with electrode adjustment speeds that can also be realized with motor driven devices.

As a result, the customary, cost-intensive retrofitting from motor driven to hydraulic electrode adjustment devices otherwise required to modernize existing furnace systems can be eliminated.

7. Compared to the above-mentioned thyristor control of DC (direct current)-furnaces, which is designed for the full power of the furnace, the present invention requires only a small installed power for the thyristor system. By arranging the system in the additional circuit, or intermediate circuit, it need be designed only for about one-half the furnace terminal power.

8. Noise emission is reduced since regulating measures can substantially prevent noisy current interruptions and refiring, or current gaps.

9. The one or three conventional load stage switches in the transformer with which high maintenance costs are associated due to the mechanical wear and high switching rates of the switches, are no longer required.

10. Automatization of the operation of *each* electrode according to an individual furnace operation diagram per melt is made possible.

11. With the aid of the arrangement of the thyristor setting device(s) and the idling choke coils in the intermediate circuit or, alternatively, of the tertiary winding(s) of the additional transformer with idling coil(s) or capacitors, it is prevented in an optimum manner that gaps occur in the electrode current when the thyristors are only partially driven. This is prevented, on the one hand, due to the superposition of a current flowing at 180° el from the main tansformer, by the controlled partial current of the additonal transformer and, on the other hand, by utilization of the secondary high current windings as smoothing chokes.

The device according to the present invention will now be described in greater detail with respect to one embodiment thereof which is shown in the drawing.

BRIEF DESCRIPTION OF THE DRAWING

FIG. 2 is a circuit diagram constituting a detail view of part of the circuit of FIG. 1.

FIG. 3a is a circuit diagram comprising a modification of the circuit diagram of FIG. 3.

FIG. 5 is a circuit diagram for a modification of the embodiment shown in FIG. 1.

FIG. 8 is a view similar to that of FIG. 6 relative to the embodiment of FIG. 3a.

DESCRIPTION OF THE PREFERRED EMBODIMENT

Figure 1:
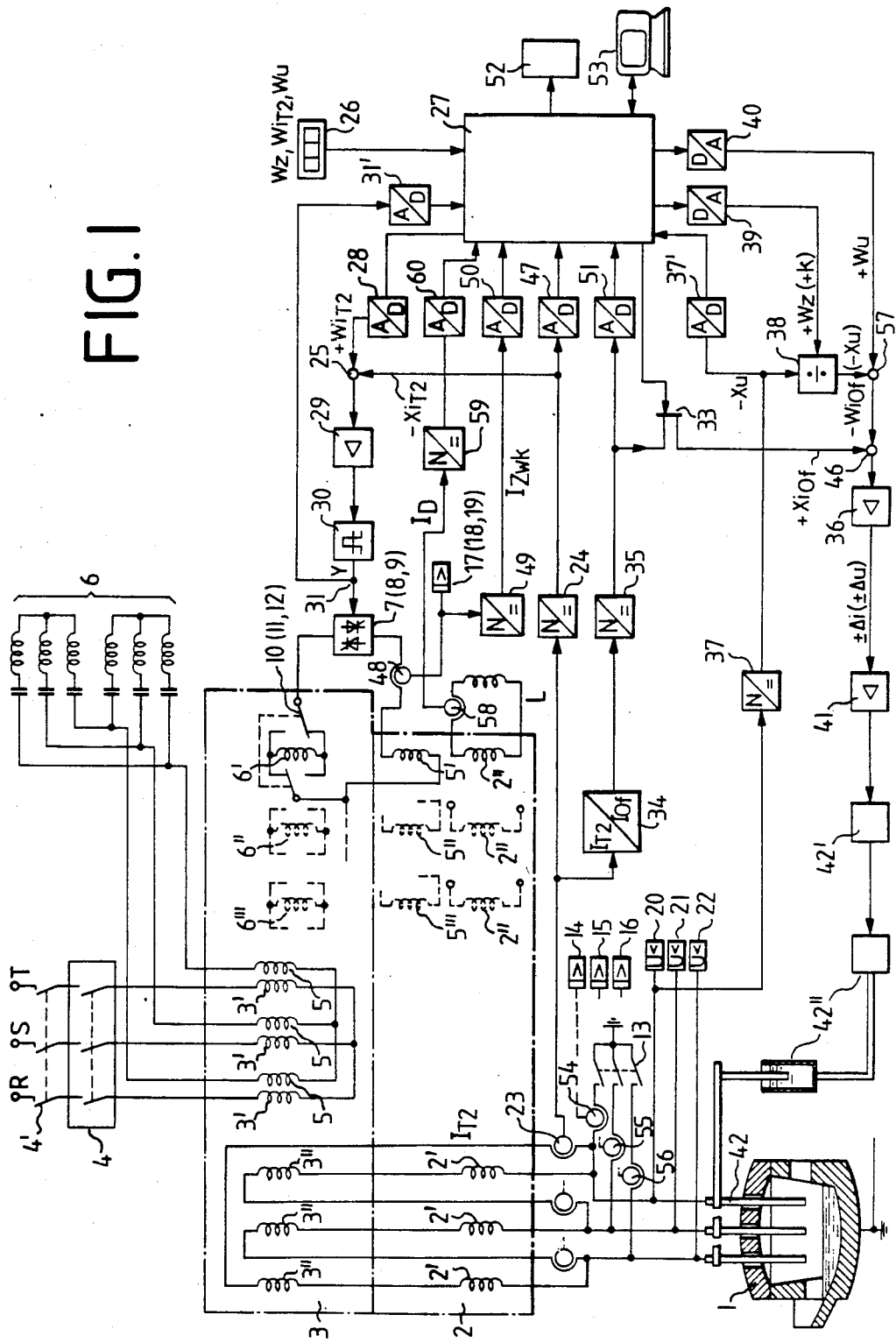
FIG. 1 is a circuit diagram of a system incorporating a preferred embodiment of the invention.

In FIG. 1, a three-phase electric arc furnace 1 is connected, via an intermediate circuit transformer assembly composed of a main transformer 3 and an additional transformer 2 and by means of a furnace breaker 4 and isolator 4', direct to a high voltage three-phase mains RST. By means of additional windings 5 in star connections, filter circuits 6 for i.e. $2^{cd}$, $3^{rd}$, $5^{th}$ harmonics are connected to a three phase high voltage system i.e. 30 kV, to improve power and distortion factor.

The primary windings 3' are connected by way of star to the high voltage three-phase mains RST.

Single-phase thyristor setting devices 7, 8, 9 are mesh-connected in the intermediate circuit as shown in the detail view of FIG. 2.

In FIG. 1, only a single phase of this arrangement of the thyristor setting devices is shown in detail, for the sake of clarity.

Intermediate circuit windings 6', 6'', 6''' of the main transformer 3 feed respective delta-connected primary windings 5', 5'', 5''' of the additonal transformer 2 together with series connected thyristor setting devices 7, 8, 9 and intermediate circuit current transformers 48, 48', 48''. The polarity of the connection between each intermediate circuit winding and its associated additional transformer primary winding is determined with the aid of respective two-pole switches 10, 11, 12 and in dependence on the position of each switch.

Switches 10, 11, 12, shown in FIG. 2, are used to supply intermediate circuit voltages $U_{zwk}$ 1, 2, 3 across windings 5, 5', 5'', respectively, with either selected polarity. In this way, a voltage setting range is realized which ranges from zero volt to the maximum secondary voltage value.

The voltage and power design of the individual transformer windings is determined primarily by the technological purpose of the furnace system.

For an arc furnace for melting scrap of iron pellets, for example, different requirements must be met with respect to voltage, power and current design.

A general dimensioning example for the voltages of an intermediate circuit transformer would be as follows:

windings 3' = 110 kV
windings 5 = 30 kV
windings 6', 6'', 6''' = 15 kV
windings 3'' = 300 V
windings 5; 5'', 5''' = 15 kV
windings 2' = 300 V, which can be connected in parallel or in antiparallel with winding 3'' by switching winding 5'
winding 2'' = 30 kV With the aid of the thyristor setting device, the voltages of windings 5', 5'', 5''' can take on individual values between about 0 and 15 kV which, depending on the position of switches 10, 11, 12, are connected in parallel and antiparallel with the secondary voltages of windings 3''.

Figure 6:
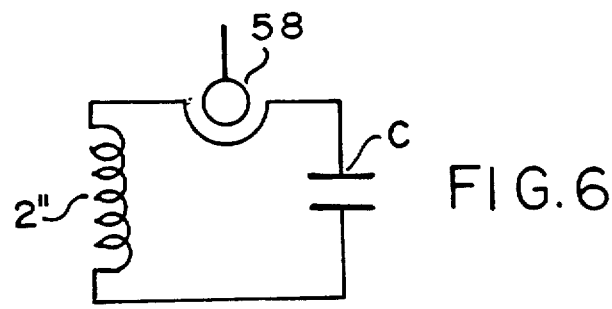
FIG. 6 is a detail view of an alternative form of a part of the embodiments of FIGS. 1 and 5.

One idling choke coil L per phase is connected to tertiary winding 2'' of additional transformer 2. This assures that even during the blocking period of thyristor setting device 7 (8, 9), a furnace current is able to flow through high current windings 3'' and 2' for a full period (180° sine). In place of each choke coil L, a capacitor C may be provided as shown in FIG. 6. In this case, each winding 2'' also serves as a reactance compensating coil.

If thyristor setting device 7 (8, 9) is fully driven during furnace opeation (firing of the thyristors), an additional furnace current is superposed per phase over the already flowing 180° furnace current, fed by the intermediate circuit through windings 5' and 2', with the magnitude and duration of flow of this additional current being determined by the moment of firing of the thyristors (assuming a constant load resistance).

If the idling choke coils were not connected, the inductances of windings 2' would absorb the entire voltage time areas of windings 3'' during the blocking period of thyristor setting device 7 (8, 9) so that, except for the magnetization currents, no furnace currents would be able to flow and, with partial actuation of the thyristor setting devices 7 (8, 9), only operation with current gaps would be possible (current flow only when the thyristor setting device is fired).

The condition of a "zero volt" furnace output voltage is realized if the voltages in the secondary windings 2' of additional transformer 2 are in phase opposition with the voltages of the corresponding secondary windings 3'' of main transformer 3. If, as protection against excessive contact voltage, the three-pole ground short-circuiter 13 is conected on the high current side, operationally required work can be performed without the otherwise required turn-off of furnace power switch 4. To monitor proper switching to "zero volt" voltage and to assure voltage free work on the furnace, excess current relays 14 through 19 are provided as well as excess voltage relays 20 through 22.

Current relays 14 to 16 are each incorporated as monitoring relays in the secondary circuits of current transformers 54, 55, 56.

If a previously set current value is exceeded, a corresponding switching order is given via a digital input to microprocessor 27. If a dangerously high excess current occurs, furnace switch 4 will be forcibly switched.

Voltage monitoring relays 20, 21, and 22 monitor the minimum voltages to ground which, for example if the furnace voltage is controlled for operation, should be at a minimum value at the furnace, i.e. approximately equal to the minimum permissible contact voltage at the electrodes during certain processing phases.

If the set values are exceeded, appropriate signals are given via digital inputs to microprocessor 27 for the purpose of reporting this and possibly actuating the furnace switch.

If malfunctions occur when the additional windings are connected in phase opposition (current relays 17, 18, 19 report that the current is unduly high) or, with the short-circuiter 13 turned on, unduly high currents flow in relay 14, 15 or 16 or the secondary voltage across voltage relay 20, 21 or 22 rises to an unduly high level, forced turn-off of the furnace power switch 4 is initiated without delay.

With this device it becomes possible to connect furnace transformers to very high voltage mains without special power switches being required for high switching frequencies, as they would presently be required either on the primary side or in the intermediate circuit of furnace transformers.

FIG. 1 shows the regulating system for one electrode 42 and its associated transformer phase. An identical system will be provided for each electrode or phase.

The regulating system for each electrode is configured essentially as follows:

Current transformer 23 and connected current measuring member 24 detect the transformer secondary current $i_{T2}$ of one phase is the transformer assembly. The detected current value is rectified in member 24 and the rectified signal is fed, as an actual value signal $-Xi_{T2}$ to a summation point 25 and also, as an input, via an A/D converter 47, to a microprocessor 27.

Current $J_D$ is detected by means of current converter 58, is rectified via the subsequent measuring member 59 and fed to microprocessor 27 via analog/digital converter 60. The microprocessor monitors the actual current value $J_D$ in order to maintain the following operating conditions:

$$J_{T2} > n \cdot J_D \text{ for } J_{zwk} > 0$$

$$J_{T2} \approx n \cdot J_D \text{ for } J_{zwk} \approx 0$$

where the factor n corresponds to the translation ratio of the winding numbers $W_{2''}/W_{2'}$ of additional transformer 2.

If the above conditions are not met, microprocessor 27 emits a corresponding report or switches the furnace off, depending on the height and duration of the current deviation.

The desired value for the transformer secondary current, $Wi_{T2}$, is either read into microprocessor 27 via a digital input 26 or is automatically formed in microprocessor 27 as a function of inputted values for a given specific furnace melting output, furnace starting weight and furnace melting time. Then it is fed as analog control value $+Wi_{T2}$, via a D/A converter 28, to summation point 25 with the output of summation point 25 being conected with the input of a current regulator 29.

The output signal of current regulator 29, which is preferably connected as a PI (proportional-integral) controller, is fed to the input of a control pulse generator 30.

A setting instruction Y travels from the output of control pulse generator 30 via a node 31 to the thyristor setting member 7, composed of two thyristors connected in polarity opposition.

From node 31, the setting signal Y is fed via an A/D converter 31' to microprocessor 27 in order to check the following operating conditions:
- if the actual current value $-xi_{T2}$ equals zero and setting instruction Y is very high (furnace start-up condition)
- if the intermediate circuit current $i_{zwk}$ is low and setting instruction Y is high (condition for connection or connection in opposition)

Setting instruction Y determines the moment of firing at which, during voltage curve $u = \sqrt{3'} \cdot U \cdot \sin \omega t$, the thyristors are fired. In the electronic system illustrated in FIG. 1, if there were a large Y signal, a small firing angle would fully drive the thyristor setting member and produce the maximum furnace voltage or a maximum furnace current, respectively.

Current $i_{Zwk}$ is detected by current transformer 48 in the associated intermediate circuit and is transmitted, via a rectifying measuring member 49 and subsequent A/D converter 50, to microprocessor 27.

If one of the two above-mentioned operating conditions has been met, e.g. at the beginning of each melting operation, microprocessor 27 makes a field effect transistor conductive.

The source electrode of FET 33 is connected, via a current converter 34 and a subsequent rectifying measuring member 35, to current transformer 23. The output of measuring member 35 is also connected, by means of an A/D converter 51, to microprocessor 27.

A current less by $\sqrt{3}$ than the actual furnace currents flows in delta connected widings 3'' and 2', so that the currents of current converters 23 must be increased by the factor $\sqrt{3}$ to be able to detect the furnace current.

The drain electrode of FET 33 leads to a summation point 46. The signal $+xi_{Of}$ of the drain electrode serves to regulate the impedance presented by furnace electrode 42.

A second measured value, the guide value $-Wi_{Of}$ needed for impedance regulation, is obtained from the actual electrode voltage value as follows:

A measuring member 37 produces an electrode voltage value $-Xu$ which is fed, as the dividend, to an analog divider 38. From microprocessor 27, a divisor value $+Wz$ is fed to divider 38 via a D/A converter 39. The value $+Wz$ is inputted in digital form to microprocessor 27 from digital input 26. If FET 33 is rendered conductive, the desired value $+Wu$, also inputted at digital input 26 for the voltage regulation, and which is transmitted by microprocessor 27 via D/A converter 40 to summation point 46, is made ineffective by microprocessor 27.

The guide value (desired value) Wz is determined by the ratio of the furnace voltage Uof to the current Iof ($Wz = Uof/Iof$).

For a certain, fixed furnace voltage value Uof and a given impedance value Wz, the furnace current Iof is predetermined (e.g. at the beginning of melting with impedance regulation). Wz and Uof, respectively, are given when the operating diagram (melting program) is fed into microprocessor 27.

For impedance regulation, the following relationship applies for the regulation deviation:

$$\pm \Delta i = (-Xu/-Wu) + Xi_{of}$$

The output signal of measuring member 37, $-Xu$, is also fed to microprocessor 27 via an A/D converter 37'. If, at summation point 46, the input to a regulating amplifier 36 is negative, i.e. the magnitude of desired value $-Wi_{Of}$ is greater than the actual value $+Xi_{Of}$, the output of power amplifier 41 connected behind regulating amplifier 36 sends a negative signal $-\Delta i$ to the setting member of an electrode adjustment device 42', e.g. a spool valve.

The electrode adjustment device, via a hydraulic electrode drive system 42'', causes electrode 42 to be lowered until, at the input of regulating amplifier 36, i.e. at summation point 46, desired and actual values are of the same magnitude and the control water valve of the electrode drive system stops the electrode movement since the electrode reached its zero position.

If the input signal in regulating amplifier 36 subsequent to summation point 46 is positive, electrode 42 is raised until the deviation from the desired value becomes zero.

After start-up, or at the beginning of the melting phase, respectively, when current $-Xi_{T2}$ has reached a value which lies within the regulating range of the thyristor setting member, microprocessor 27 switches from impedance regulation to electrode voltage regulation, as follows: FET switch 33 is opened, the actual value $-Xu$, since a positive value $+k$ is given, reaches, via divider 38, the input of regulating amplifier 36 as actual value —Xu.

During voltage regulation, the following applies for the regulation deviation:

$$\pm\Delta u=(-Xu/k)+Wu$$

where k should be understood as the correction value for the actual value —Xu.

At the same time, microprocessor 27 applies a positive desired value Wu via D/A converter 40 to the input of regulating amplifier 36. The desired value Wu may either be inputted via digital input 26 or be automatically formed in the microprocessor in the same manner as the desired current value $Wi_{T2}$.

If a positive deviation exists between desired value Wu and actual value —Xu, electrode 42 is raised until the regulating deviation $+\Delta U$ at the output of regulating amplifier 36 or at the input of power amplifier 41, respectively, has become zero.

If the deviation is negative, indicating that the electrode voltage —Xu is greater than the given desired value, electrode 42 is lowered until the deviation $\Delta U=0$ is reached.

In summing point 57, —Xu is carried together with guide value Wu.

Wu is a measure for the distance of the electrodes from the material being melted.

All inputs and outputs, alarm and status display, can be displayed and monitored by way of a numerical display 52 and a monitor 53 having an associated input keyboard.

The active power of the three electrodes and the symmetrical wear of the furnace can be observed over a long period of time and can be controlled and corrected with the aid of different desired values which are put into digital input 26.

To realize automatic operation, the active power delivered by each of the three electrodes is calculated in microprocessor 27 from the measured values obtained via members 35 and 37, and are compared with desired power values which microprocessor 27 has computed from the given furnace charge starting weight and a specific melting performance per charge preselected with the aid of monitor 53.

To attain the shortest possible melting time, microprocessor 27 automatically changes the desired value inputs —$Wi_{T2}$ and Wu when the desired melting energy level has been reached. Depending on the melting weight, put in via monitor 53, an individual furnace operation diagram is obtained for each furnace charge and electrode structure to attain the shortest possible melting time and the most symmetrical consumption possible for each electrode.

Conventional operating diagrams are generally calculated as follows:
1. input of the weight of the scrap basket;
2. input of the desired specific kWh consumption per ton;
3. giving the desired voltage stage for the transformer load stage switch, i.e. Lb furnace voltage ($U_{furnace}$) for various energy blocks;
4. giving the desired melting current ($I_{furnace}$) or impedance value $z=U_{furnace}/I_{furnace}$, respectively.

Figure 4:
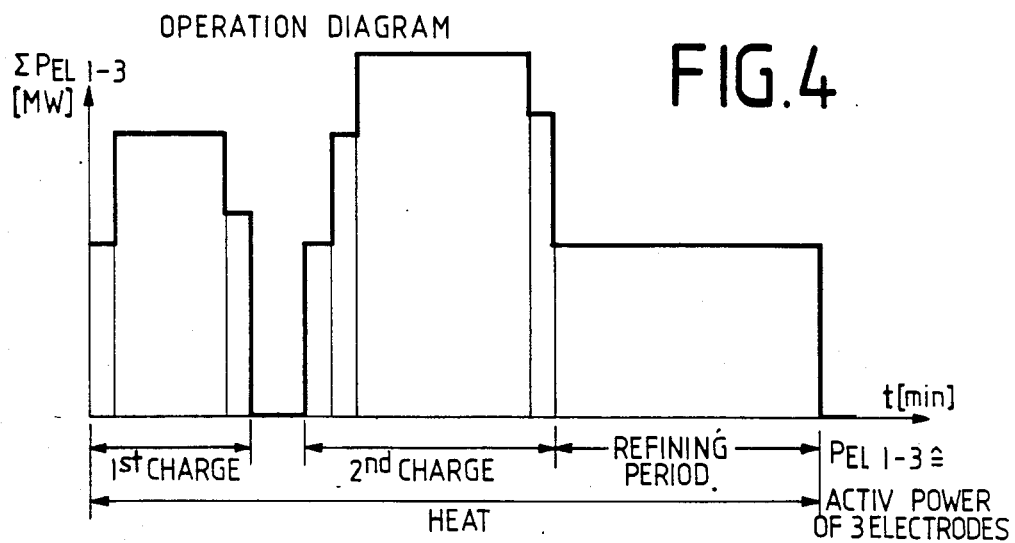
FIGS. 4 and 4a depict power diagrams for the energy control of individual furnace electrodes and a three-phase electric arc furnace as a whole, [respectively].

From the continuous energy consumption measurements at the furnace, an operating diagram will automatically result, see FIG. 4.

In contrast thereto, the invention provides the possibility of invoking an operating diagram for each electrode so that, due to the fact that the electrode voltages are dynamically adjustable, active power and energy consumption, respectively, can be controlled [separately] under each electrode.

Figure 4A:
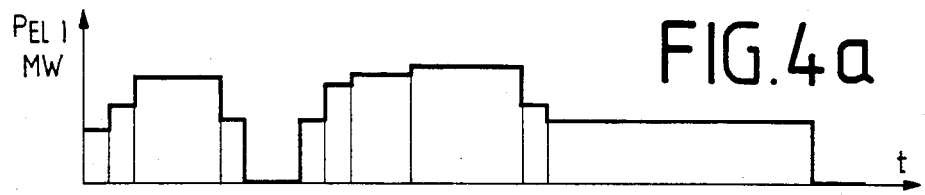
Figure 4B:
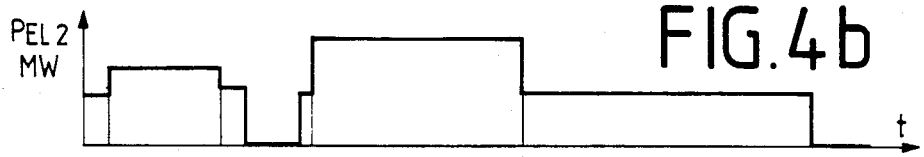
Figure 4C:
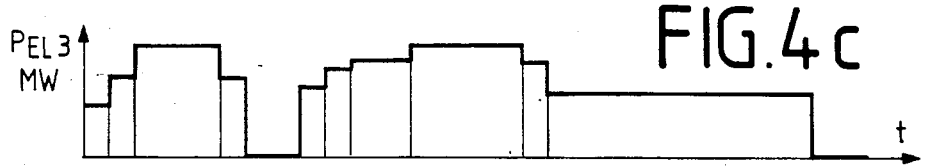
Figure 4D:
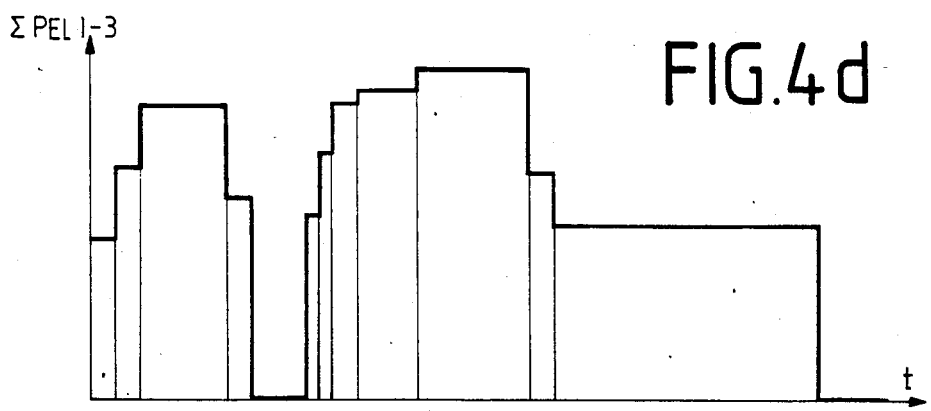

As can be seen in FIG. 4a, these energy blocks are able to provide desired values in the form of height (=power level) and width (time section) and these can be processed as mentioned above.

In contrast to the conventional mode of operation, energy consumption is here monitored and assured under each electrode and, in addition to protecting the furnace lining, this also results in savings of energy due to reduced, thermal asymmetry.

Substantial reduction of thermal asymmetry means that the melting process under each electrode is peformed no longer than necessary.

Unnecessary heating of the furnace lining and of the water-cooled furnace walls is avoided by timely reduction of the active power of each electrode since the specific melting energy is given for each electrode and this energy consumption is monitored by microprocessor 27.

If instead of scrap, sponge iron (pellets) is used, even better operating conditions can be realized since pellets are charged continously and directly under each electrode.

By possibly dynamically adapting the load power to continuous pellet charging, oversupply as known to occur in practice (discontinuity between pellets supplied and electrical energy) can be avoided.

Figure 3:
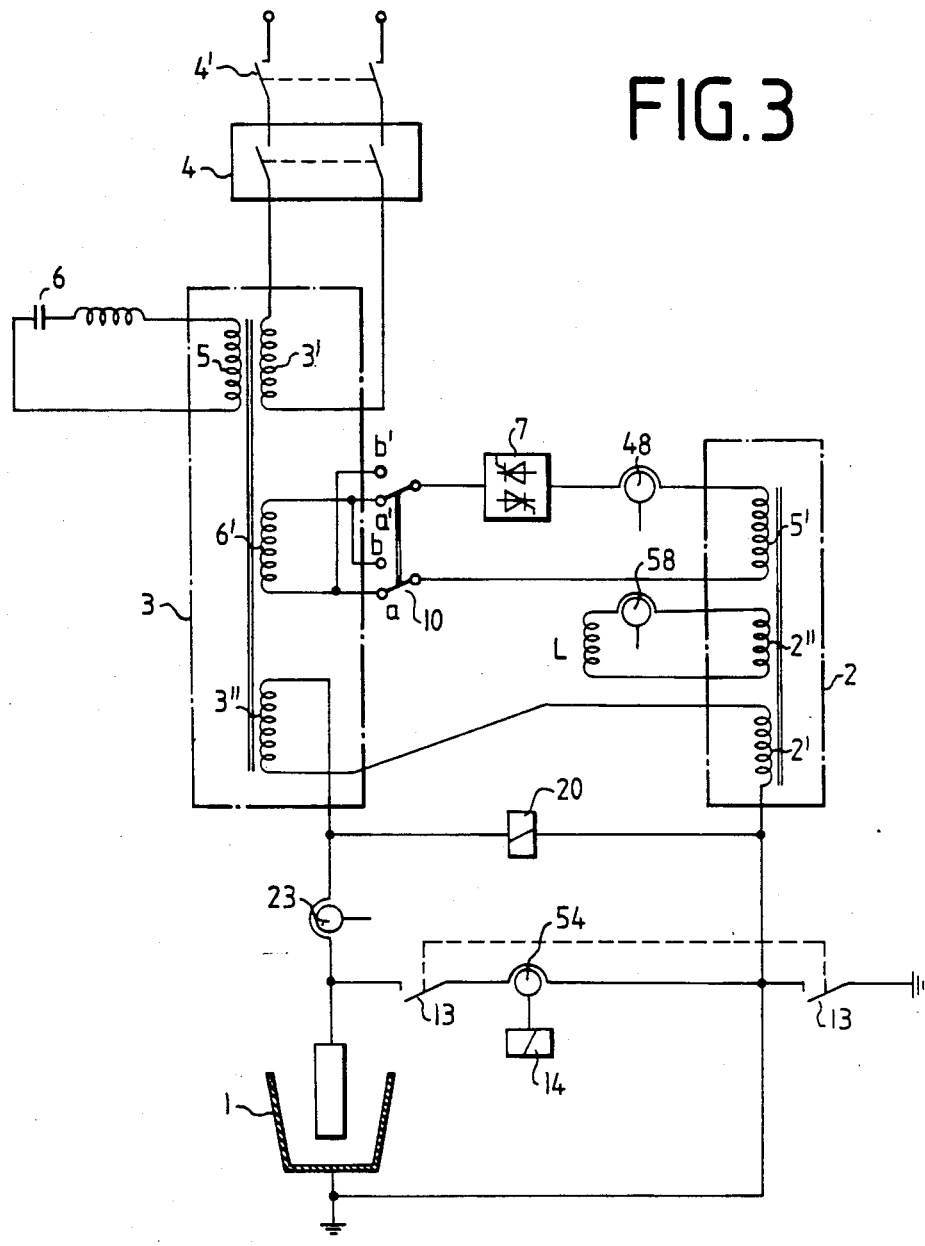
FIG. 3 is a curcuit diagram constituting a detail view of a modified portion of FIG. 1.

FIG. 3 shows an arrangement of a single-phase electrode arrangement which could be used, for example, for a single-electrode furnace or for a multiple-electrode furnace.

The main transformer 3 is composed of primary winding 3', intermediate circuit winding 6' and secondary winding 3''. Additional transformer 2 with its primary winding 5' is supplied by intermediate circuit winding 6' via a switch 10 composed of thyristor setting device 7 and current transformer 48. The voltage across winding 2' of additional transformer 2 is thus in phase or 180° out of phase with the voltage across winding 3'', depending on the switching state of switch 10 for the furnace voltage.

Figure 7:
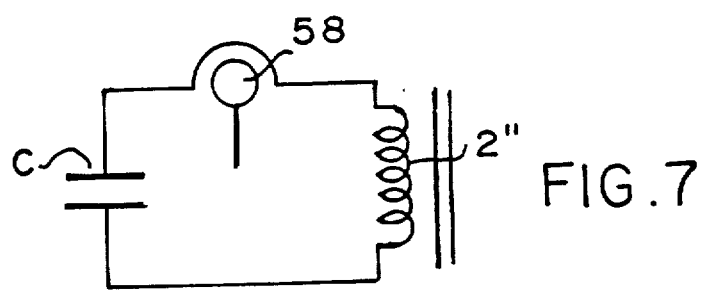
FIG. 7 is a view similar to that of FIG. 6 relative to the embodiment of FIG. 3.

An idling choke coil L is connected to additional transformer 2 via a tertiary winding 2''. Coil L may be replaced by a capacitor C, as shown in FIG. 7.

Figure 8:
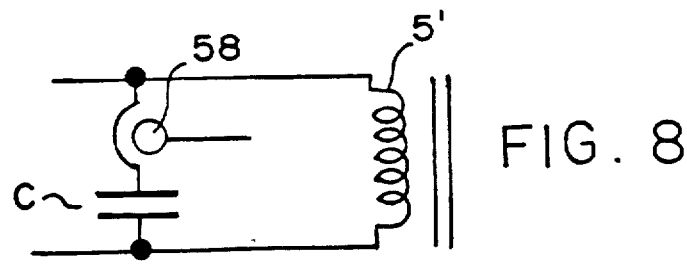

As an alternative to FIG. 3, FIG. 3a shows an idling choke coil without tertiary winding 2'' which is disposed directly in the intermediate circuit in parallel with winding 5'. The coil may be replaced by a capacitor C, as shown in FIG. 8.

As a variation, it is possible to select, for example for a three-electrode furnace, three single-phase transformer arrangements each according to FIG. 3 with the intermediate circuit, however, being connected as shown in FIG. 2. To eliminate the bottom electrode, the secondary windings of the single-phase transformers could be delta-connected on the furnace side.

The switching cycle for actuation of turning switch 10 will be described with reference to FIG. 3 for single-phase, three-phase or multiphase circuits for the operational voltage turn-off at the furnaces:

Switching Cycle

A. Furnace is disconnected (with furnace switch 4 and separator switch 4' switched on)

1. setting instruction Y=0, i.e. thyristor setting device 7 is set to voltage "0"=$I_{zwk}$=0;
2. switching of turning switch 10 to counter-voltage from position a/a' to b/b', so that voltage 3" minus voltage 3' results in approximately zero ($U_3''-U_2'\approx 0$);
3. short-circuit device 13 is inserted for the purpose of monitoring that the current $\approx 0$ and current relay 14 is inserted as contact protection for furnace personnel.

Monitoring of the contact voltage is effected by means of voltage relay 14.

B. Furnace is switched on (with furnace switch 4 and separator switch 4' already switched on):
1. short-circuit switch 13 is opened;
2. depending on whether required or not—turning switch 10 is switched to center voltage (from position b/b' to position a/a') so that voltages $U_3''$ and $U_2'$ can be added;
3. depending on whether required or not—the Y setting instructin is driven up from 0, i.e. the firing angle of the thyristor setting device is driven in the direction of increasing the voltage.

As an alternative to the circuit arrangement shown in FIG. 1 or FIG. 2, respectively, for the thyristor setting devices in delta connection, a connecton in the form of a star, as shown in FIG. 5, is likewise possible.

Primary windings 3' are in delta connection via furnace switch 4 and separating switch 5, windings 5 for connecting the filter circuits remain in star connection.

The intermediate circuit windings 6' (6", 6''') of main transformer 3 and windings 5', 5", 5''' of additional transformer 2 are each connected in a star and are connected in series with one another via thyristor setting devices 7, (8, 9).

Subvoltage windings 3" of main transformer 3 are connected in a star and in series with subvoltage windings 2' of the additional transformer.

In the three phases, the idling choke coils L are connected to additional transformer 2 via tertiary windings 2". In place of each choke coil L, a capacitor C may be provided as shown in FIG. 6. In this case, each winding 2" also serves as a reactance compensating coil.

The second terminals of windings 2' are brought out of the transformer for the connection of furnace 1.

In the leads to the furnace, the furnace currents are detected directly via current converters 23. The short-circuiting device 13 including measuring device 14 (15, 16), 20 (21, 22), 54, 55, 56 is of the same design as described in connection with FIG. 1.

It will be understood that the above description of the present invention is susceptible to various modifications, changes and adaptations, and the same are intended to be comprehended within the meaning and range of equivalents of the appended claims.

What is claimed is:

1. Operation control system for an electrothermal furnace having at least one heating electrode, and transformer means for supplying heating current to the electrode, the transformer means for the electrode including a transformer unit having a primary winding connected to receive a mains voltage, a first secondary winding constituting a source of heating current for the electrode, and a second secondary winding, an additional transformer unit connected to derive an adjustable additional voltage from the second secondary winding, and means connected for deriving operating current for the electrode from the voltage across the first secondary winding and the adjustable additional voltage, said control system including a control assembly for the transformer means for the electrode, said control assembly conprising:
    (a) measuring means operatively connected to the first secondary winding for deriving a first current signal representing the magnitude of the current through the first secondary winding;
    (b) signal supply means including a microprocessor for supplying a second current signal representing the desired magnitude of the current through the first secondary winding, based on a predetermined furnace operation schedule which represents the active power to be supplied by the electrode as a function of time;
    (c) arithmetic means connected to said measuring means and said signal supply means for providing a difference signal representative of the difference between current magnitudes represented by the first and second current signals;
    (d) current flow control means including a thyristor unit connected in series with said second secondary winding and said additional transformer unit for controlling the flow of current from said second secondary winding to said additional transformer, and thus the value of the additional voltage;
    (e) regulating means connected between said first arithmetic means and said current flow control means for supplying to said thyristor unit firing pulses which are timed for causing the flow of current from said second secondary winding to be a function of the difference signal; and
    (f) switch means operatively associated with said second secondary winding and switchable between a first state in which the operating current for the electrode is derived from the algebraic sum of the voltage across said first secondary winding and the adjustable additional voltage and a second state in which the operating current for the electrode is derived from the difference between the voltage across said first secondary winding and the adjustable additional voltage.

2. A system as defined in claim 1, further comprising means connected for regulating the voltage applied to the electrode by comparison of the actual electrode voltage value with a desired voltage value supplied by said signal supply means.

3. A system as defined in claim 1, wherein the electrothermal furnace is a three-phase furnace having three heating electrodes and three such transformer means each for supplying heating current to a respective electrode and forming a three-phase transformer arrangement, said control system includes three control assemblies each identical to said control assemby, and said thyristor units of said three control asseimblies are connected together.

4. A system as defined in claim 3, wherein said thyristor units of said three control assemblies are connected together in a delta connection.

5. A system as defined in claim 3, wherein said thyristor untis of said three control assemblies are connected together in a star connection.

6. A system as defined in claim 1, wherein said thyristor unit is connected between said second secondary winding and said additional transformer unit.

7. A system as defiend in claim 1, further comprising switch control means connected to said current flow means and said switch means for bringing the current in said second secondary winding to a value of zero and for switching said switch between its states when the current in said second secondary winding has the value of zero.

8. A system as defined in claim 1, wherein the furnace further has a main power switch for connecting the primary winding of the main transformer unit to a power mains, and said current flow control means and said switch means are operative for bringing the operating current for the electrode to a value of zero without opening the main power switch.

9. A system as defined in claim 1, wherein the furnace further includes adjustment means connected to adjust the position of the electrode in order to effect regulation of the voltage at the electrode, and said signal supply means further comprises means connected for controlling the adjustment means to bring the electrode voltage to a desired value.

10. A system as defined in claim 9, wherein the furnace is a reduction furnace and said means for controlling the adjustment means comprise a step regulator.

11. A system as defined in claim 10, wherein said step regulator is a three-point regulator.

12. A system as defined in claim 1, wherein said signal supply means comprise means for varying the second current signal automatically based on the predetermined furnace operation schedule.

13. A system as defined in claim 1 wherein said additional transformer unit comprises at least one tertiary winding and an idling choke coil connected to said tertiary winding, so that said tertiary winding acts as an idling coil to prevent current gap operation.

14. A system as defined in claim 1 wherein said additional transformer unit comprises at least one tertiary winding and a capacitor connected to said tertiary winding, so that said tertiary winding acts as an idling coil to prevent current gap operation and as a reactance compensation coil.

15. A system as defined in claim 1 wherein said additional transformer unit comprises at least one primary winding and an idling choke coil connected to said primary winding, so that said primary winding acts as an idling coil to permit current gap operation.

16. A system as defined in claim 1 wherein said additional transformer unit comprises at least one primary winding and a capacitor connected to said primary winding, so that said primary winding acts as an idling coil to prevent current gap operation and as a reactance compensation coil.

* * * * *

UNITED STATES PATENT AND TRADEMARK OFFICE
CERTIFICATE OF CORRECTION

PATENT NO.   : 4,677,643

DATED        : June 30, 1987

INVENTOR(S)  : Hermann Dicks

It is certified that error appears in the above-identified patent and that said Letters Patent is hereby corrected as shown below:

Figs 6, 7 and 8 of the drawings should be added as shown on the attached sheet.

Signed and Sealed this

Sixth Day of November, 1990

Attest:

HARRY F. MANBECK, JR.

*Attesting Officer*   *Commissioner of Patents and Trademarks*